(12) United States Patent  
Nishio

(10) Patent No.: US 7,391,222 B2  
(45) Date of Patent: Jun. 24, 2008

(54) DEFLECTOR

(75) Inventor: Masahiro Nishio, Yokohama (JP)

(73) Assignee: Olympus Corporation, Tokyo (JP)

( * ) Notice: Subject to any disclaimer, the term of this patent is extended or adjusted under 35 U.S.C. 154(b) by 130 days.

(21) Appl. No.: 11/297,508

(22) Filed: Dec. 8, 2005

(65) Prior Publication Data

US 2006/0139719 A1    Jun. 29, 2006

(30) Foreign Application Priority Data

Dec. 28, 2004    (JP) .............................. 2004-378552

(51) Int. Cl.  
*G01R 27/26*    (2006.01)

(52) U.S. Cl. .......................... 324/662; 324/97; 324/658; 359/196

(58) Field of Classification Search .................. 324/662, 324/97  
See application file for complete search history.

(56) References Cited

U.S. PATENT DOCUMENTS

| | | | |
|---|---|---|---|
| 2,326,252 A * | 8/1943 | Rich ............................ | 324/97 |
| 4,421,381 A * | 12/1983 | Ueda et al. .................. | 359/214 |
| 5,767,666 A * | 6/1998 | Asada et al. ................... | 324/97 |
| 5,821,420 A * | 10/1998 | Cho et al. ................. | 73/504.16 |
| 6,188,504 B1 * | 2/2001 | Murakami et al. .......... | 359/224 |
| 6,989,614 B2 * | 1/2006 | Mizoguchi et al. ............ | 310/36 |
| 7,071,594 B1 * | 7/2006 | Yan et al. ..................... | 310/309 |
| 7,123,400 B2 * | 10/2006 | Murakami et al. .......... | 359/298 |

FOREIGN PATENT DOCUMENTS

JP            07-218857            8/1995

* cited by examiner

*Primary Examiner*—Andrew H. Hirshfeld  
*Assistant Examiner*—John Zhu  
(74) *Attorney, Agent, or Firm*—Scully, Scott, Murphy & Presser, P.C.

(57) ABSTRACT

A deflector which enables to have a sufficient degree of freedom of designing and also to detect accurately a displacement angle of a movable plate can be provided. In order to accomplish this, the deflector includes a mirror, a base frame, a pair of torsion bars which pivotably support the mirror with respect to the base frame, a drive coil which is provided on the mirror, two permanent magnets which generate a magnetic flux which acts in the drive coil, two capacitive sensors which output an angle of oscillation of the mirror as electrical characteristics, a connecting portion which electrically connects on the mirror a first end out of two ends of the drive coil and one end of electric terminals of the two capacitive sensors, and a first wire which is drawn from the connecting portion up to the torsion bars via the base frame.

17 Claims, 16 Drawing Sheets

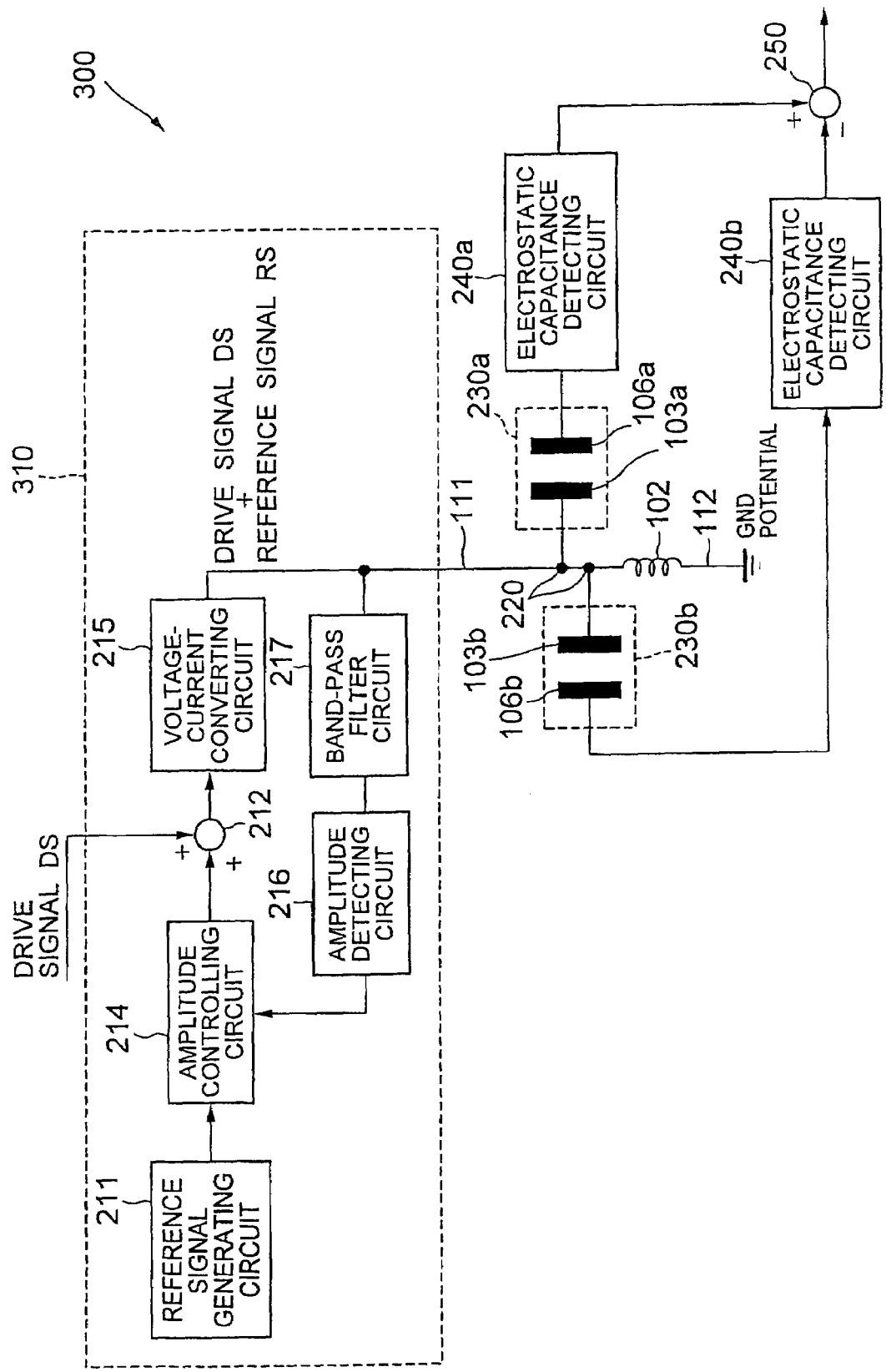

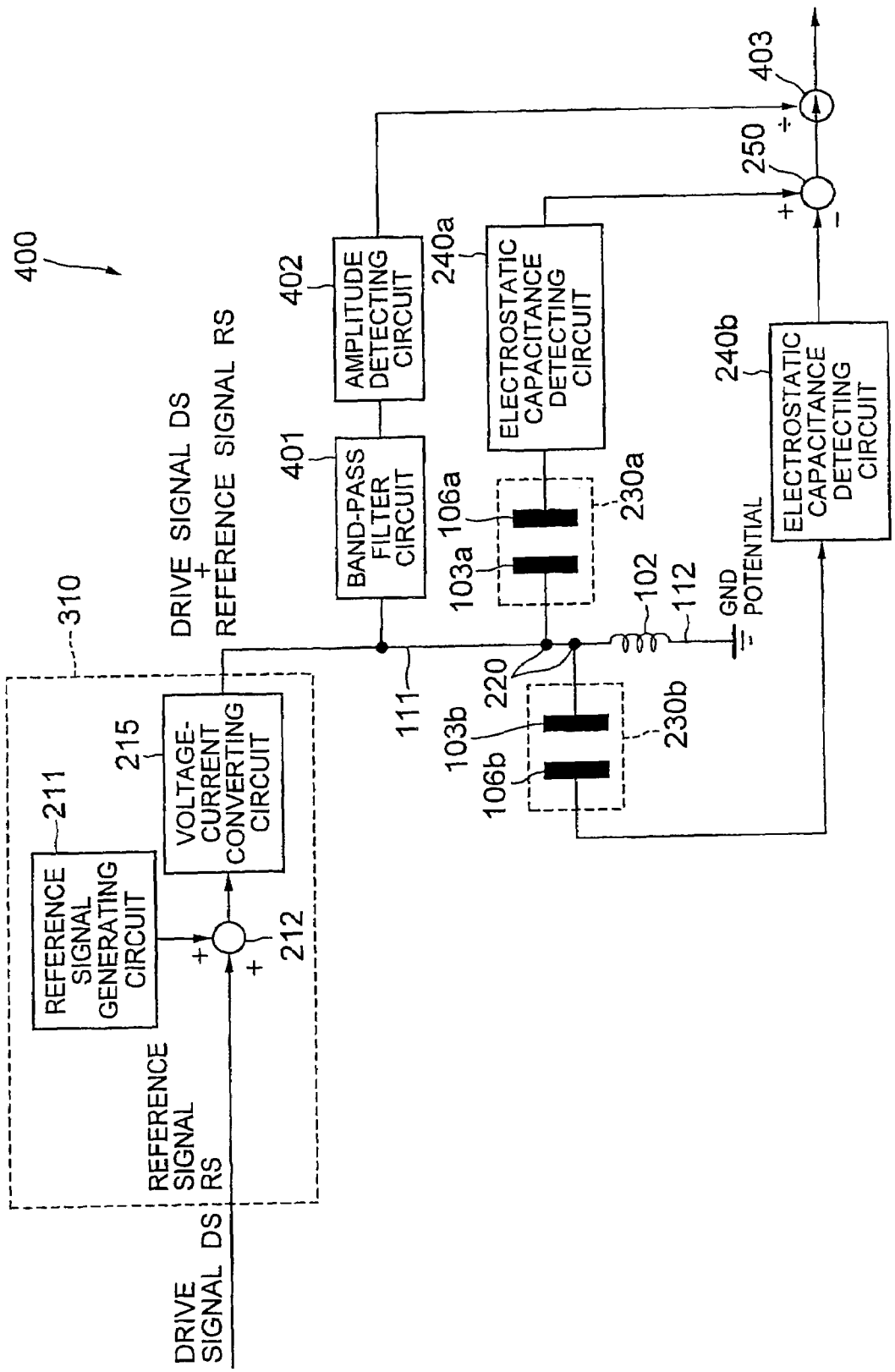

DEFLECTOR

CROSS-REFERENCE TO RELATED APPLICATION

The present application is based upon and claims the benefit of priority from the prior Japanese Patent Application No. 2004-378552 filed on Dec. 28, 2004; the entire contents of which are incorporated herein by reference.

BACKGROUND OF THE INVENTION

1. Field of the Invention

The present invention relates to a deflector and in particular to a deflector in which an electromagnetic force is used.

2. Description of the Related Art

A structure disclosed in Japanese Patent Application Laid-open Publication No. Hei 7-218857 for example, is hitherto known for detecting a displacement angle of a mirror of a deflector. FIG. 14 denotes a structure disclosed in Japanese Patent Application Laid-open Publication No. Hei 7-218857. In this structure, a capacitance type displacement-angle detection method is used. Electrodes 16A and 17A are provided on a rear surface of a mirror 12 at positions symmetrical with respect to an axis 11. Electrodes 16B and 17B which form pairs with the electrodes 16A and 17A are provided on a side of a glass substrate 14. Thus, condensers C1 and C2 are formed. A displacement angle of the mirror 12 is detected based on a difference in capacitance of the two condensers C1 and C2 due to an angular displacement of the mirror 12.

However, in the structure disclosed in Japanese Patent Application Laid-open Publication No. Hei 7-218857, the electrodes 16A and 17A on one side of the electrostatic capacitance which detect an angle of the mirror 12, are on the mirror 12 which is a movable plate. Accordingly, for detecting the electrostatic capacitance, it is necessary to draw wires connected to the electrodes 16A and 17A outside a deflector via a torsion bar which supports the movable plate. For this, it is necessary to form a wiring on the torsion bar. As a result of this, a degree of freedom of designing the deflector is declined.

SUMMARY OF THE INVENTION

The present invention is made in view of the abovementioned problem, and it is an object of the present invention to provide a deflector which allows to have a substantial degree of freedom of designing and which is capable of detecting accurately a displacement angle of a movable plate.

For attaining the object by finding a solution to the above-mentioned problem, according to the present invention, there can be provided a deflector which is characterized by including a movable plate, a fixed portion, a pair of elastic members which pivotably supports the movable plate with respect to the fixed portion, a drive coil provided on the movable plate, a magnetic-flux generator which generates a magnetic flux to act in the drive coil, an angle detector which outputs an angle of oscillation of the movable plate as a change of electrical characteristics, a connecting portion which electrically connects on the movable plate a first end out of two ends of the drive coil and one end of electric terminals of the angle detector, and a first wire which is drawn from the connecting portion up to the fixed portion via the elastic member.

According to an aspect of the present invention, it is desirable that the angle detector detects the angle of oscillation of the movable plate based on an electrostatic capacitance between a first electrode on the movable plate and a second electrode provided facing the first electrode, and the connecting portion connects the first electrode and the first end of the drive coil.

Moreover, according to another aspect of the present invention, it is desirable that the deflector includes an electrostatic capacitance detecting circuit which is connected to the second electrode formed on the fixed portion and detects an electrostatic capacitance between the first electrode and the second electrode, a reference signal generating circuit which generates a reference signal required for an operation of the electrostatic capacitance detecting circuit, an adder which adds up a drive command signal of the drive coil and the reference signal, and an amplifier which amplifies an output of the adder and supplies an amplified output to the drive coil, and the output of the amplifier is connected on a side of the fixed portion to the first wire.

According to still another aspect of the present invention, it is desirable that the deflector includes the electrostatic capacitance detecting circuit which is connected to the second electrode formed in the fixed portion and detects the electrostatic capacitance between the first electrode and the second electrode, the reference signal generating circuit which generates the reference signal required for the operation of the electrostatic capacitance detecting circuit and supplies the generated reference signal to the second electrode, the amplifier which amplifies the drive command signal of the drive coil, and a second wire which is electrically connected on the movable plate to the second end of the drive coil and drawn from the connecting portion up to the fixed portion via the elastic member, and the output of the amplifier is connected on the side of the fixed portion to the second wire, and the first wire is connected to a fixed electric potential.

According to still another aspect of the present invention, it is desirable that the reference signal generating circuit generates a reference signal of a frequency which is not in a drive frequency band of the deflector.

According to still another aspect of the present invention, it is desirable that the reference signal generating circuit generates a reference signal of a frequency in a band of frequency which is higher by predetermined multiples of the maximum value in the drive frequency band.

According to still another aspect of the present invention, it is desirable that the amplifier includes a current amplifying circuit which controls such that a current to the drive coil is proportional to the drive command signal, and the reference signal generating circuit has an amplitude controller which controls an amplitude such that a frequency component of the reference signal of a voltage in the first electrode is constant.

According to still another aspect of the present invention, it is desirable that the amplifier includes a current amplifying circuit which controls such that the current to the drive coil is proportional to the drive command signal, and the electrostatic capacitance detecting circuit includes a divider which divides a value of detected capacitance by an amplitude of the frequency component of the reference signal of a voltage in the first electrode.

According to still another aspect of the present invention, the first electrode includes comb teeth formed on an end face of the movable plate and the second electrode includes comb teeth formed by extending from a fixed end facing the comb teeth on the end face of the movable plate.

According to still another aspect of the present invention, the first electrode includes a plurality of electrodes formed on the movable plate symmetrically with respect to an axis of rotation of the movable plate, the second electrode includes a plurality of electrodes facing the plurality of electrodes on the movable plate, and regarding capacitance of the electrode on the movable plate and of the electrode facing the electrode on the movable plate, a difference between capacitance of the electrodes disposed symmetrically is let to be an angle.

In the present invention, the movable plate is pivotably supported with respect to the fixed portion by a pair of elastic members. The drive coil is provided to the movable plate. The magnetic flux generator generates the magnetic flux which acts in the drive coil. Moreover, the angle detector outputs the angle of oscillation of the movable plate as the change of electrical characteristics. The connecting portion electrically connects the first end out of the two ends of the drive coil and one end of the electric terminals of the angle detector on the movable plate. Moreover, the first wire is drawn from the connecting portion up to the fixed portion via the elastic member. In this structure, at least the first wire may be formed on the elastic member. This enables to have a sufficient degree of freedom of designing. Furthermore, the angle detector detects the angle of oscillation of the movable plate as the change of the electrical characteristics. Therefore, the displacement angle of the movable plate can be detected accurately. As a result of this, it is possible to provide a deflector which enables to have a sufficient degree of freedom of designing and to detect accurately the displacement angle of the movable plate.

BRIEF DESCRIPTION OF THE DRAWINGS

FIG. 7 is a diagram denoting a circuit structure of a first modified embodiment of the first embodiment;

FIG. 8 is a diagram denoting a circuit structure of a second modified embodiment of the first embodiment;

DETAILED DESCRIPTION OF THE INVENTION

Embodiments of the present invention will be described below in detail with reference to the accompanying diagrams. However, the present invention is not restricted to these embodiments.

First Embodiment

Figure 1:
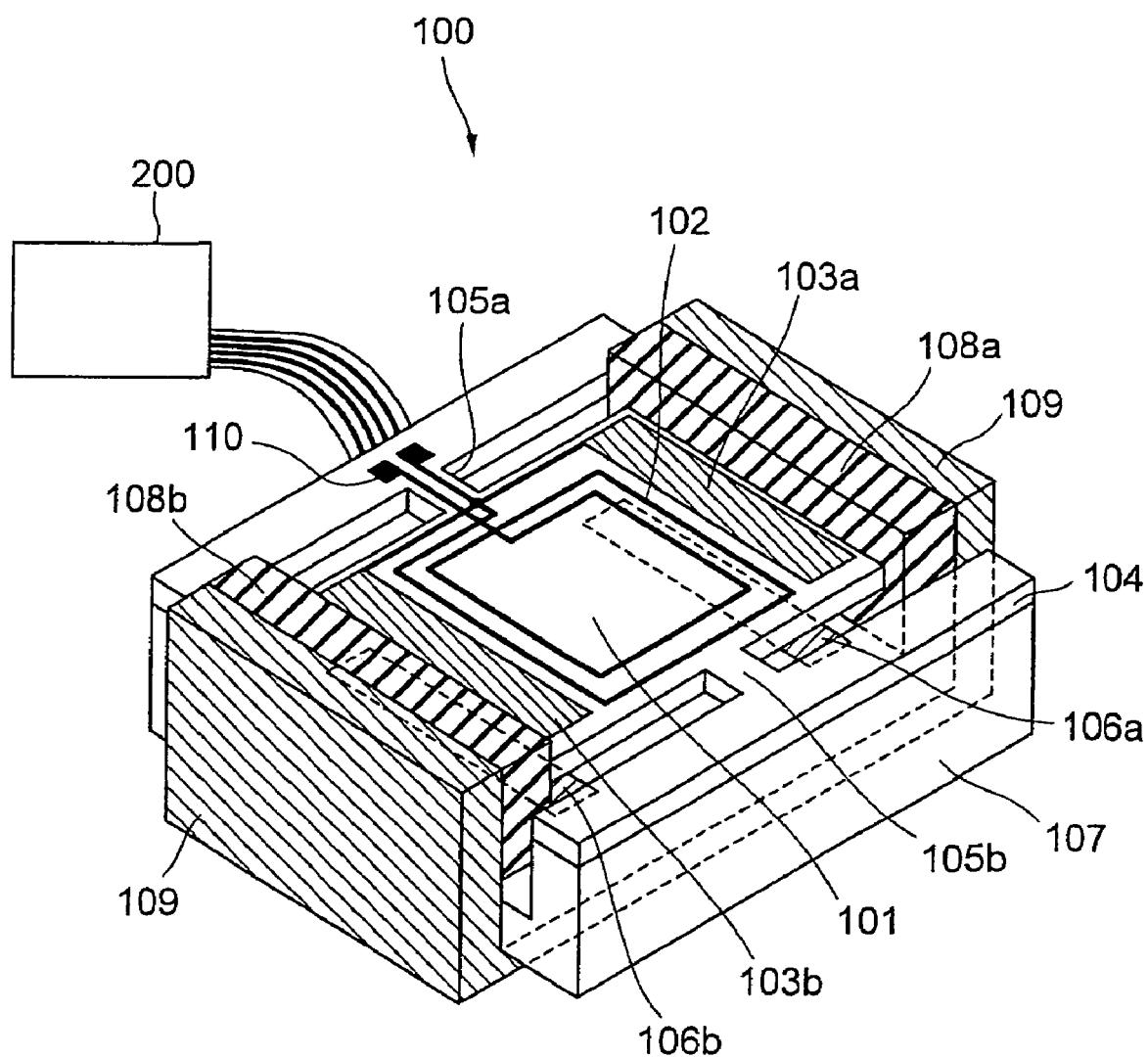
FIG. 1 is a diagram denoting a schematic structure of a deflector of a first embodiment.

FIG. 1 denotes a schematic structure of a deflector 100 according to a first embodiment of the present invention. The deflector 100 is manufacture by using a micro machine technology. A mirror 101 has a substantially rectangular shape and is disposed in a spatial magnetic flux. A reflecting surface is formed on a front surface side of the mirror 101. Moreover, a drive coil 102, a movable portion electrode 103a, and a movable portion electrode 103b are formed on a rear surface side of the mirror 101. In this case, the front surface means a surface on an upper side in FIG. 1 which is visible. The rear surface means a surface on a lower side in FIG. 1 which is not visible. The mirror 101 corresponds to a movable plate. The movable portion electrode 103a and the movable portion electrode 103b are formed near two sides facing each other of the substantially rectangular shaped mirror 101.

Moreover, a supporting member 104, torsion bars 105a and 105b, the mirror 101, and the drive coil 102 are formed integrally on a silicon wafer by a silicon micro machining technology. After forming integrally on the silicon wafer, the silicon wafer is cut and adhered to a base frame 107 on which a fixed portion electrode 106a and a fixed portion electrode 106b are formed. Further, the adhered structure is combined with a member, which includes permanent magnets 108a and 108b, and a yoke 109, to form the deflector 100. The permanent magnets 108a and 108b, and the yoke 109 correspond to a magnetic flux generator. The supporting member 104 and the base frame 107 correspond to a fixed portion.

When a current is applied to the drive coil 102 from an electrode portion (electrode pad) 110 formed on the supporting member 104, a Lorentz force acts due to a mutual relationship of a magnetic flux generated by the permanent magnets 108a and 108b, and a current flowing in the drive coil 102. The mirror 101 is connected to the supporting member 104 via two torsion bars 105a and 105b. The torsion bars 105a and 105b correspond to elastic members. Due to the action of the Lorentz force, the mirror 101 rotates with an axis of rotation passing through the torsion bars 105a and 105b as a center. When the flow of the current is reversed, a direction in which the Lorentz force has been acting is reversed. At this time, the mirror 101 rotates in an opposite direction with the axis of rotation passing through the torsion bars 105a and 105 as a center. Laser beam is irradiated from a light source (not shown in the diagram) on the reflecting surface of the mirror 101. Current is applied to the drive coil 102. Due to the current, the mirror 101 oscillates. Corresponding to an angle of rotation of the mirror 101, reflected light of the laser beam is deflected at mirror 101. The angle of rotation of the mirror 101 is determined by a current value. A relation between the angle of rotation of the mirror 101 and the current value is non linear and changes with the lapse of time. Therefore, when the mirror 101 is to be displaced (deflected) through an accurate angle, by using a detector for detecting the angle of rotation, the drive current is controlled such that the detected angle of rotation becomes a target angle.

In the case, oscillation means a repeated reciprocating movement around a predetermined virtual axis. However, the oscillation is not restricted to the repeated reciprocating movement and also means a movement including only an inclination around the predetermined virtual axis. For example, the movable plate oscillates means the movable plate is inclined around an axis and the movable plate vibrates repeatedly. Moreover, the angle of rotation of the mirror 101 means an angle (angle of oscillation) when the mirror 101 oscillates.

The deflector 100 of the first embodiment includes an angle detector (angle sensor) in which an electrostatic capacitance is used. The movable portion electrode 103a and the fixed portion electrode 106a are disposed to face each other. Similarly, the movable portion electrode 103b and the fixed portion electrode 106b are disposed to face each other. Each of the movable portion electrodes 103a and 103b corresponds to a first electrode. Each of the fixed portion electrodes 106a and 106b corresponds to a second electrode. An electrostatic capacitance between the electrodes increases and decreases according to the angle of rotation of the mirror 101. Therefore, the angle of rotation can be detected by using an electrostatic capacitance value. In this case, the movable portion electrode 103a and the fixed portion electrode 106a form an electrostatic capacitive sensor 230a (refer to FIG. 5). The movable portion electrode 103b and the fixed portion electrode 106b form an electrostatic capacitive sensor 230b (refer to FIG. 5). Each of the electrostatic capacitive sensors 230a and 230b corresponds to the angle detector. The electrostatic capacitive sensor 230a and the electrostatic capacitive sensor 230b are disposed symmetrically with respect to the axis of rotation of the mirror 101. Therefore, a change in the capacitance of the electrostatic capacitive sensors 230a and 230b is complimentary. Each of the electrostatic capacitive sensor 230a and the electrostatic capacitive sensor 230b corresponds to a plurality of electrodes.

Figure 2:
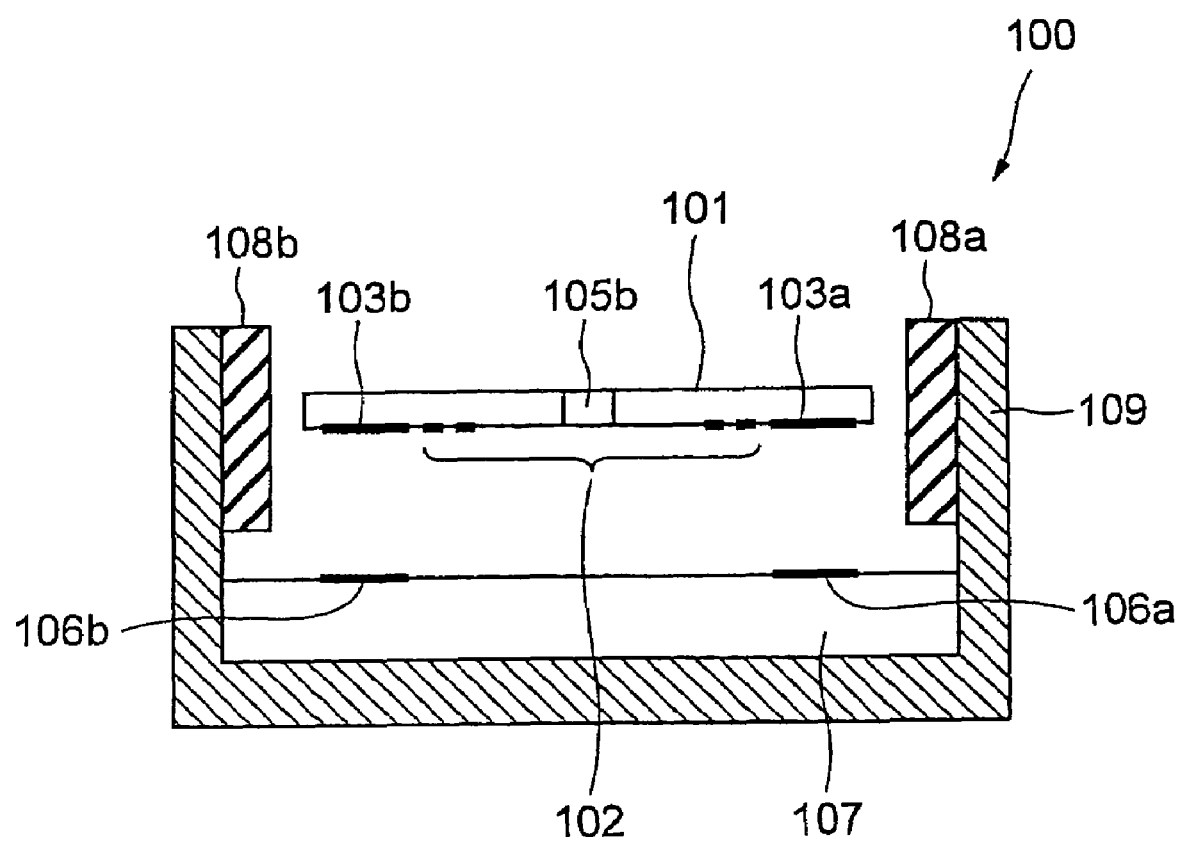
FIG. 2 is a diagram denoting a cross-sectional structure of the deflector of the first embodiment.

FIG. 2 denotes a cross-sectional structure of the deflector 100. As mentioned above, the drive coil 102 is formed on the rear surface side of the mirror 101. Moreover, the movable portion electrodes 103a and 103b are provided at positions facing each other on both sides of the mirror 101. The fixed portion electrodes 106a and 106b are formed at positions facing the movable portion electrodes 103a and 103b respectively. Furthermore, the pair of permanent magnets 108a and 108b is formed on outer sides of the mirror 101. Each of the permanent magnets 108a and 108b is supported by the yoke 109. The yoke 109 includes a magnetic material.

Figure 3A:
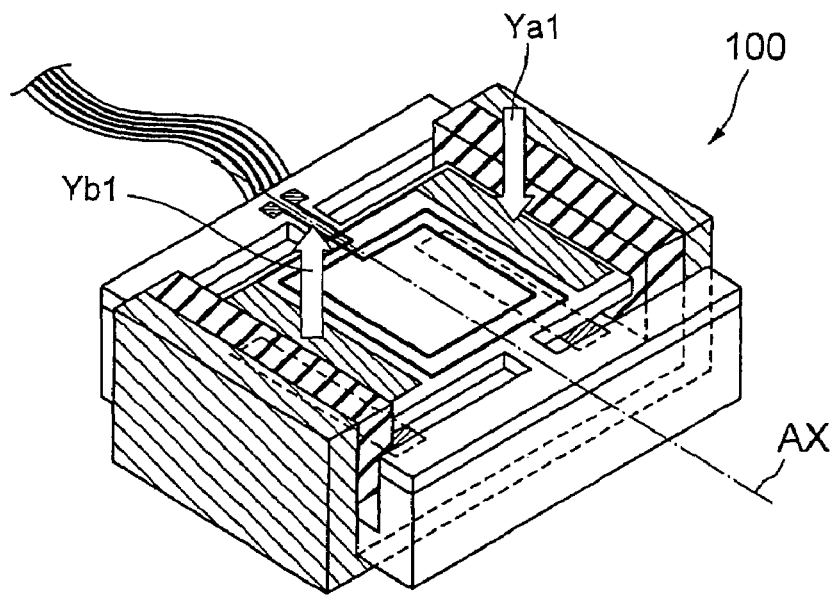
FIG. 3A is a diagram denoting a movement of a movable plate in the first embodiment.
Figure 3B:
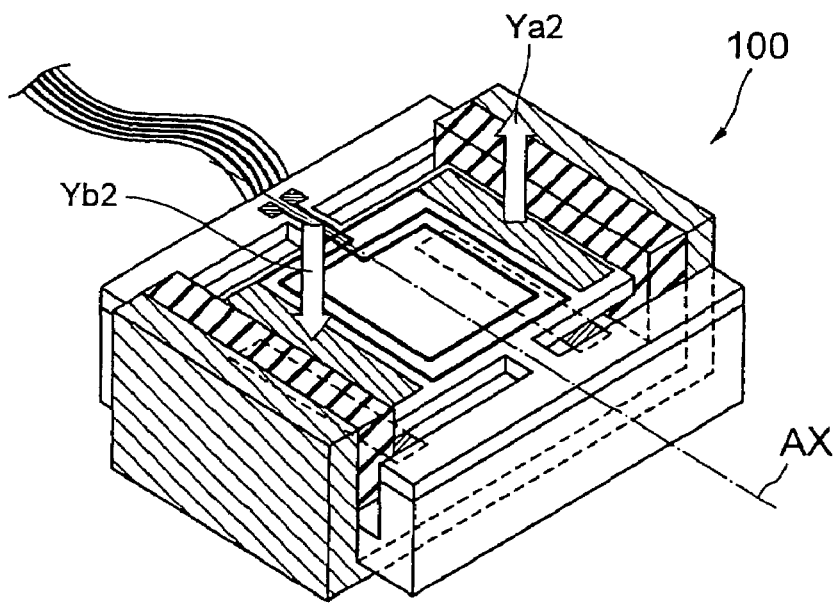
FIG. 3B is a diagram denoting the movement of the movable plate in the first embodiment.
Figure 4:
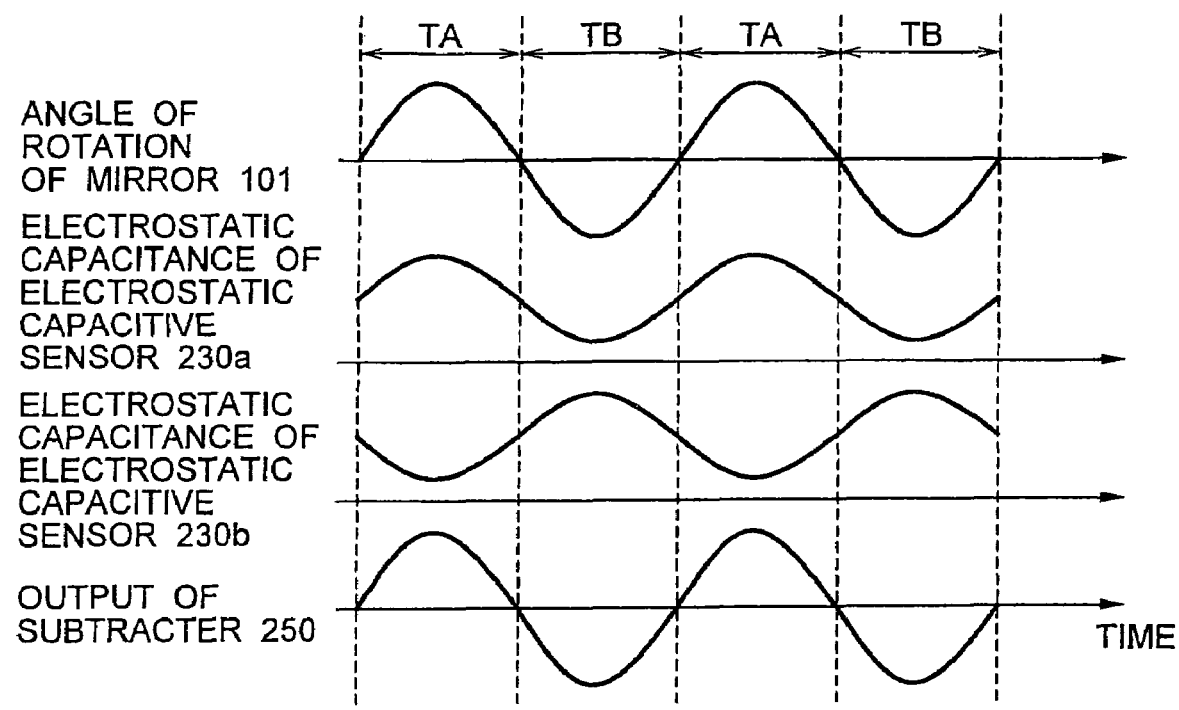
FIG. 4 is a diagram denoting a change in an output of a capacitive sensor of the first embodiment.

FIG. 3A and FIG. 3B are diagrams showing direction of rotation of the mirror 101. The mirror 101 of the deflector 100 rotates about an axis of rotation AX in a direction shown by arrows Ya1 and Yb1 in FIG. 3A and in a direction shown by arrows Ya2 and Yb2 in FIG. 3B. A relationship between the angle of rotation of the mirror 101 and a change in the capacitance of the electrostatic capacitive sensors 230a and 230b is described below with reference to FIG. 4.

When the mirror 101 of the deflector 100, which is in a parallel position substantially parallel to the supporting member 104, rotates in a direction shown by the arrows Ya1 and Yb1 in FIG. 3A and returns to the parallel position, let a time taken by the mirror 101 for this rotation be TA. At this time, the movable portion electrode 103a and the fixed portion electrode 106a come closer to each other. Due to this, the electrostatic capacitance of the electrostatic capacitive sensor 230a is increased. Moreover, the movable portion electrode 103b and the fixed portion electrode 106b go away from each other. Due to this, the electrostatic capacitance of the electrostatic capacitive sensor 230b is decreased. When the mirror 101 reaches the maximum angle of rotation in the direction shown by the arrows Ya1 and Yb1, a distance between the movable portion electrode 103a and the fixed portion electrode 106a is the minimum. Therefore, the electrostatic capacitance of the electrostatic capacitive sensor 230a is the maximum. At this time, the distance between the movable portion electrode 103b and the fixed portion electrode 106b is the maximum. Therefore, the electrostatic capacitance of the electrostatic capacitive sensor 230b is the minimum.

When the mirror 101, which is in a parallel position, rotates in a direction shown by the arrows Ya2 and Yb2 in FIG. 3B and returns to the parallel position, let a time taken by the mirror 101 for this rotation be TB. At this time, the movable portion electrode 103a and the fixed portion electrode 106a go away from each other. Due to this, the electrostatic capacitance of the electrostatic capacitive sensor 230a is decreased. Moreover, the movable portion electrode 103b and the fixed portion electrode 106b come closer to each other. Due to this, the electrostatic capacitance of the electrostatic capacitive sensor 230b is increased. When the mirror 101 has reached the maximum angle of rotation in the direction shown by the arrows Ya2 and Yb2, the distance between the movable portion electrode 103a and the fixed portion electrode 106a is the maximum. Therefore, the electrostatic capacitance of the electrostatic capacitive sensor 230a is the minimum. The distance between the movable portion electrode 103b and the fixed portion electrode 106b is the minimum. Therefore, the electrostatic capacitance of the electrostatic capacitive sensor 230b is the maximum. The electrostatic capacitive sensors 230a and 230b, thus correspond to the angle detector. Because the angle detector, in other words the angle sensor, uses the electrostatic capacitance, it can be structured simply.

Figure 5:
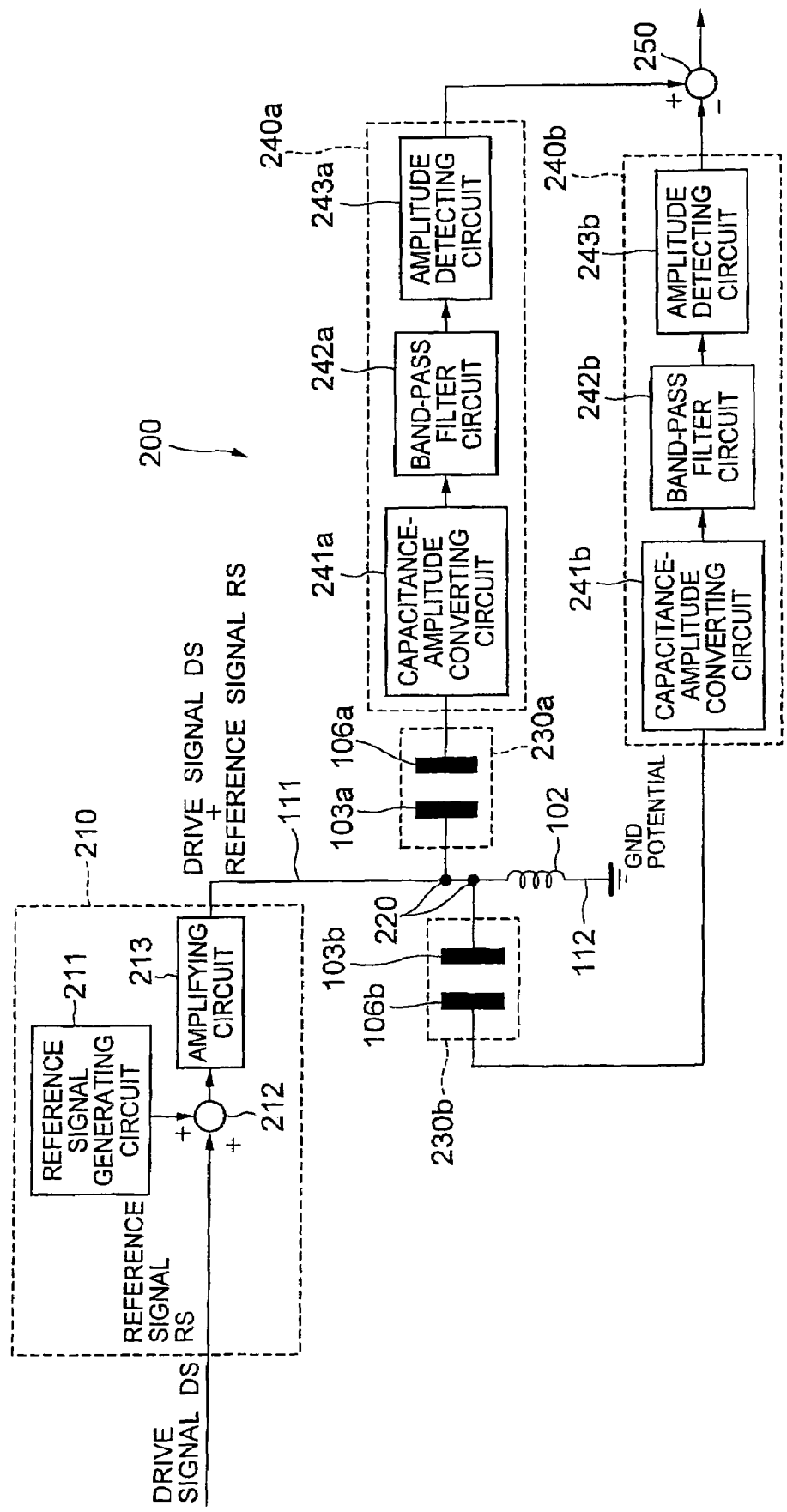
FIG. 5 is a diagram denoting a circuit structure of the first embodiment.

Next, the electrostatic capacitive sensors 230a and 230b, and a circuit 200 which detects the angle of rotation of the mirror 101 will be described. FIG. 5 denotes a schematic structure of the circuit 200. The movable portion electrode 103a and the fixed portion electrode 103b are connected to a first end of the drive coil 102 and a first wire 111 at a connecting portion 220 on the rear surface of the mirror 101. The first wire 111 is drawn to an outside of the mirror 101 via a surface of the torsion bar 105a. The first wire 111 drawn, is connected to a driving circuit 210 provided outside the deflector 100. A second end of the drive coil 102 is connected to a second wire 112. The second wire 112 is connected to a reference potential, for example GND (ground) potential, of the electrostatic capacitance detecting circuit which is installed outside the deflector 100 via the torsion bar 105a. The reference potential corresponds to a fixed electric potential.

An adder 212 of the driving circuit 210 adds a drive signal DS and a reference signal RS generated in a reference signal generating circuit 211. An added signal is amplified in an amplifying circuit 213. The amplifying circuit 213 corresponds to an amplifier. The first wire 111 applies a signal which is resulted by adding the drive signal DS for rotating the mirror 101 and the reference signal RS for operating capacitance-amplitude converting circuits 241a and 241b. The movable portion electrodes 103a and 103b are terminated at the reference potential of the electrostatic capacitance detecting circuit, which is far away from the driving circuit 210, by the drive coil 102 which is near a terminating point. This enables to detect the capacitance with accuracy and high anti-noise characteristics.

An electrostatic capacitance detecting circuit 240a is connected to the fixed portion electrode 106a of the electrostatic capacitive sensor 230a. An electrostatic capacitance detecting circuit 240b is connected to the fixed portion electrode 106b of the electrostatic capacitive sensor 230b.

The electrostatic capacitance detecting circuit 240a includes the capacitance-amplitude converting circuit 241a, a band-pass filter circuit 242a, and an amplitude detecting circuit 243a. Moreover, the electrostatic capacitance detecting circuit 240b includes the capacitance-amplitude converting circuit 241b, a band-pass filter circuit 242b, and an amplitude detecting circuit 243b. As it is described later, the reference signal RS is applied to each of the electrostatic capacitive sensors 230a and 230b. The capacitance-amplitude converting circuits 241a and 241b detect a current flowing through the electrostatic capacitive sensors 230a and 230b when the reference signal RS is applied. Further, the capacitance-amplitude converting circuits 241a and 241b output a signal of amplitude proportional to an electrostatic capacitance value of the electrostatic capacitive sensors 230a and 230b.

The band-pass filter circuits 242a and 242b allow to pass only a frequency component of the reference signal RS with respect to an output signal of the capacitance-amplitude converting circuits 241a and 241b respectively. By allowing to pass only the frequency component of the reference signal RS, the band-pass filters 242a and 242b eliminate signals unnecessary for the detection of the angle of rotation such as a signal derived from the drive signal DS.

The amplitude detecting circuits 243a and 243b detect amplitude of an output signal of the band-pass filter circuits 242a and 242b respectively. Further, the amplitude detecting circuits 243a and 243b output a signal equivalent to a capacitance value of the electrostatic capacitive sensors 230a and 230b. As mentioned above, a change in the electrostatic capacitance of the electrostatic capacitive sensor 230a and the electrostatic capacitive sensor 230b appears complimentarily. A subtracter 250 derives a difference in outputs of the electrostatic capacitance detecting circuit 240a connected to the electrostatic capacitive sensor 230a and the electrostatic capacitance detecting circuit 240b connected to the electrostatic capacitive sensor 230a. This enables to obtain the angle of rotation of the mirror 101. Thus, an influence of an isophase noise can be reduced. Hereby, an angle detection with high accuracy can be performed.

The signal resulted by adding the reference signal RS and the drive signal DS is applied to the electrostatic capacitive sensor 230a and the electrostatic capacitive sensor 230b. An effect of the drive signal DS is eliminated by passing of an output of the capacitance-amplitude converting circuits 241a and 241b through the band-pass filter circuits 242a and 242b which allow to pass a frequency band of the reference signal RS.

Frequency of the reference signal RS is set to a value which is not in the drive frequency band. It is desirable that frequency of the reference signal RS is set to a value which is higher by predetermined multiples of the maximum value in the drive frequency band. For example, a band which is about ten times higher can be set as predetermined multiples. Accordingly, when the band-pass filter circuits 242a and 242b are let to be primary with Q=1 for example, the effect of the drive signal DS in the detection of capacitance can be reduced to about one tenth. Therefore, the angle of rotation can be detected accurately. Moreover, if the reference signal RS is set to a high frequency side which is higher than a frequency in the drive frequency band by predetermined multiples, the mirror 101 can be driven by using a DC (direct current) component. Therefore, the angle of rotation can be detected even more accurately.

Moreover, if attention is focused on the drive signal DS, a signal in which the drive signal DS and the reference signal RS are added, is applied also to the drive coil 102. In this case, the reference signal RS is a high value differing by predetermined multiples, such as ten times for example, from the maximum value in the drive frequency band of the mirror 101. Therefore, an oscillation component generated due to the reference signal RS can also be reduced up to one tenth. As a result of this, the mirror 101 can be driven stably.

Figure 6A:
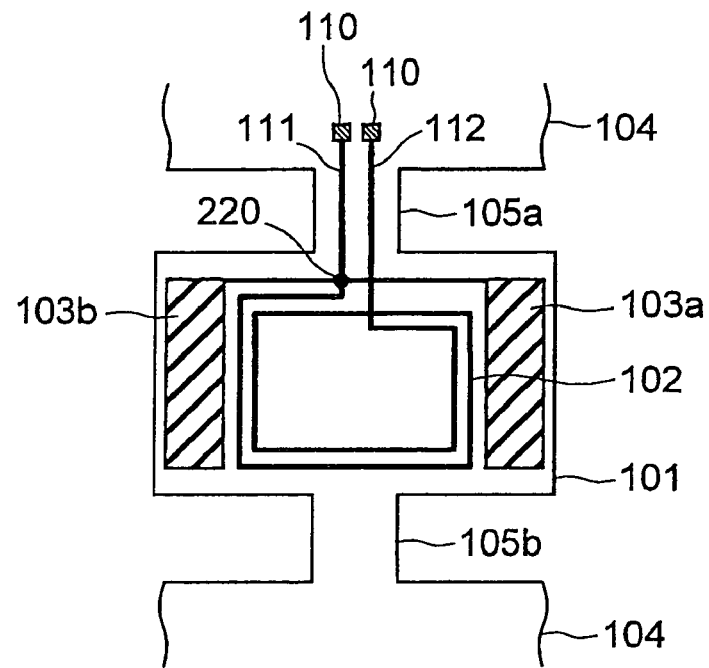
FIG. 6A is a diagram denoting a wiring structure on a torsion bar of the first embodiment.
Figure 6B:
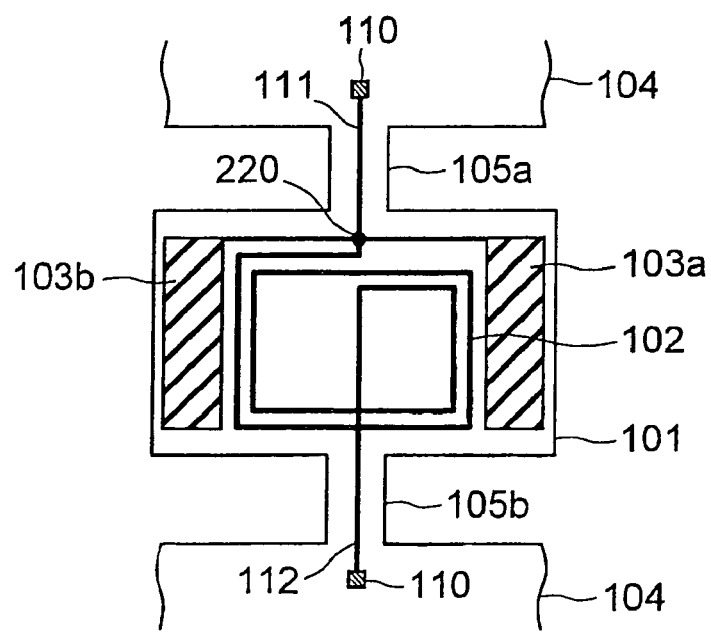
FIG. 6B is another diagram denoting the wiring structure on the torsion bar of the first embodiment.

Next, an electrical wiring on the torsion bars 105a and 105b will be described below. FIG. 6A and FIG. 6B denote a structure of wiring on the torsion bars 105a and 105b respectively, in the first embodiment. Moreover, FIG. 6C denotes a structure of wiring when all wires are drawn simply.

Figure 6C:
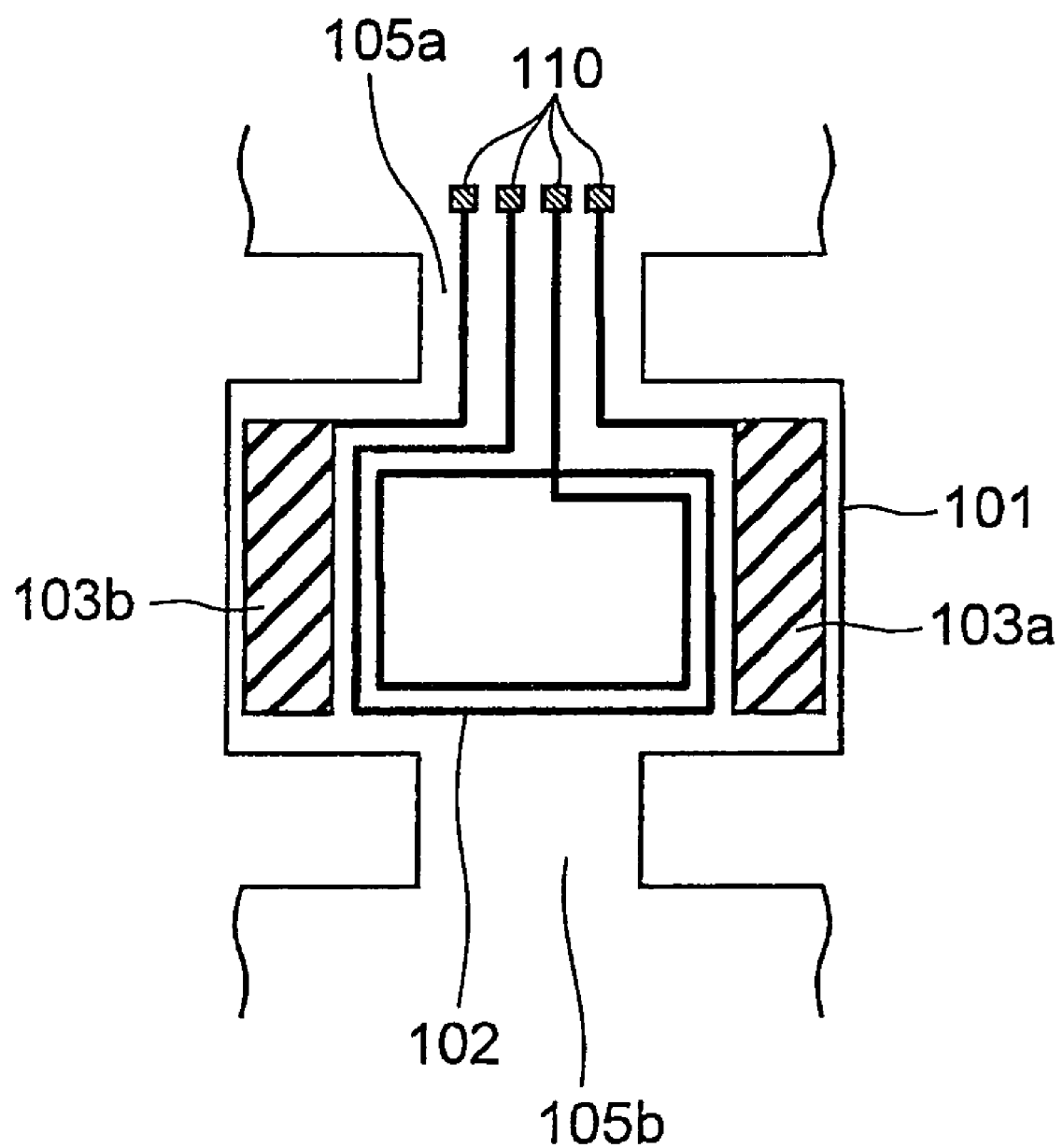
FIG. 6C is a diagram denoting the wiring structure on the torsion bar when the wires are drawn simply.

First of all, the structure when all wires are drawn simply as shown in FIG. 6C will be described. In all, four wires, i.e. two wires connected to the drive coil 102 and two wires connected to the movable portion electrode 103a and the movable portion electrode 103b respectively, are disposed on the torsion bar 105a. Due to a restriction in the manufacturing, a lower limit value of a spacing between wires and a width of wires in the wiring are restricted. Therefore, the torsion bar 105a can not be made thinner than a predetermined width. Width of the torsion bars 105a and 105b is an important parameter for determining a coefficient of elasticity of the torsion bars 105a and 105b. Thus, if all the wires are drawn simply, the width of the torsion bars 105a and 105b has to be made greater than a predetermined value. As a result of this, the degree of freedom of designing of the deflector is constrained.

FIG. 6A denotes the structure of the wiring on the torsion bar 105a in the first embodiment. The movable portion electrode 103a and the movable portion electrode 103b are connected on the mirror 101 to one end of the drive coil 102. Accordingly, the wiring disposed on the torsion bar 105a includes only two wires connected to the drive coil 102. Due to reduction in the number of wires from four (FIG. 6C) to two, as compared to the structure in FIG. 6C, the width of the torsion bar 105a can be reduced. Therefore, the degree of freedom of designing is improved. Concretely, by reducing the width of the torsion bar 105a, the torsion bar 105a can be structured to have a high flexibility. As a result of this, a deflector having high drive sensitivity and a greater angle of deflection can be realized.

In the structure shown in FIG. 6A, the two wires of the drive coil 102 are formed on one of the torsion bars i.e. torsion bar 105a. However, there is no restriction on forming the two wires and one wire each can be passed to each of the pair of torsion bars 105a and 105b. In the structure shown in FIG. 6B, as compared to the structure shown in FIG. 6A, the degree of freedom of designing can be improved further.

As mentioned above, by the structure in which the number of wires on the torsion bars 105a and 105b is reduced as compared to the structure in which the wires are drawn simply, the capacitance of the electrostatic capacitive sensors 230a and 230b can be detected. As a result of this, in the deflector 100 which includes the angle detector, the degree of freedom of designing the torsion bars 105a and 105b can be improved.

In the first embodiment, a structure in which each of the electrostatic capacitive sensors 230a and 230b is used as the angle detector, is used. However, the present invention is not restricted to this and the angle detector can have a structure employing a method described below in (1) and (2).

(1) A method in which a distortion of the torsion bars 105a and 105b is detected as impedance (2) A method in which a coil for detection is provided on each of the mirror 101 (movable plate) and the base frame 107 (fixed portion) and an amount of mutual induction between the two coils is detected When the structure employing (1) and (2) mentioned above is used, in the connecting portion 220 on the rear surface of the mirror 101, the drive coil 102 and one end of the angle detector are connected. Accordingly, the angle can be detected without increasing the number of wires on the torsion bars 105a and 105b. Therefore, the degree of freedom of designing the torsion bars 105a and 105b can be improved.

Moreover, the first embodiment has a structure in which the electrostatic capacitance detecting circuits 240a and 240b are disposed outside the deflector 100. However, the present invention is not restricted to this structure and the similar effect can be achieved even when the electrostatic capacitance detecting circuits 240a and 240b are formed or disposed on the supporting member 104 or the base frame 107. Furthermore, in the first embodiment the permanent magnets 108a and 108b, and the yoke 109 are used as a structure to generate the magnetic flux. However, a structure using an electromagnet and a yoke may be employed.

First Modified Embodiment

Next, a first modified embodiment of the first embodiment will be described below. Taking into consideration controllability, it is desirable that a current signal is let to be the drive signal. For example, in the structure of the first embodiment, a case of current control is to be considered. First of all, a signal in which the drive signal DS and the reference signal RS are added is converted into a current signal through a voltage-current converting circuit. The converted current signal is applied to the drive coil 102. In this case, a voltage amplitude of the reference signal RS applied to the electrostatic capacitive sensors 230a and 230b is changed by a resistance value of the drive coil 102. Therefore, even when the capacitance of the electrostatic capacitive sensors 230a and 230b is invariant and constant, an output of the electrostatic capacitance detecting circuits 243a and 243b may be considered to be increased or decreased in proportion to the voltage amplitude of the reference signal RS. Thus, if the current control is performed in a simple manner in the structure of the first embodiment, it may give rise to the above-mentioned problem. The following modified embodiment includes a circuit structure which is formed upon considering such problem.

In the first modified embodiment, by using a circuit 300 shown in FIG. 7, current amplitude of the reference signal is controlled to maintain to be constant the voltage amplitude of the reference signal applied to the electrostatic capacitive sensors 230a and 230b. The electrostatic capacitance detecting circuits 240a and 240b in FIG. 7 have the same structure as the electrostatic capacitance detecting circuits 240a and 240b in the first embodiment. In other words, the electrostatic capacitance detecting circuits 240a and 240b include a capacitance-amplitude converting circuit, a band-pass filter circuit, and an amplitude detecting circuit. Description of the structure same as in the first embodiment is omitted to avoid repetition.

A driving circuit 310 of the first modified embodiment applies a current signal proportional to a signal in which the reference signal RS and the drive signal DS are added to the first wire 111 via a voltage-current converting circuit 215. A voltage-current converting circuit 215 corresponds to the current amplifying circuit. A band-pass filter circuit 217 detects only the frequency component of the reference signal RS from the voltage signal in the first wire 111. An amplitude detecting circuit 216 outputs an amplitude value of an output signal of the band-pass filter circuit 217. Accordingly, a voltage amplitude of the frequency component of the reference signal RS in a connecting portion of the drive coil 102 can be detected. An amplitude controlling circuit 214, the amplitude detecting circuit 216, and the band-pass filter circuit 217 correspond to an amplitude controller. The reference signal generating circuit 211 generates the reference signal RS. The generated reference signal RS is input to the adder 212 via the amplitude controlling circuit 214. The amplitude controlling circuit 214 increases or decreases amplitude of the reference signal RS so that the output of the amplitude detecting circuit is maintained to constant. Accordingly, the amplitude of the frequency component of the reference signal RS in the connecting portion of the drive coil 102 is maintained to be substantially constant. The adder 212 adds an output of the amplitude controlling circuit 214 and the drive signal DS. An added signal is input to the voltage-current converting circuit 215. The voltage-current converting circuit 215 applies current proportional to an input signal, to the drive coil 102. If an attention is focused on the frequency band of the drive signal DS, it can be seen that a current proportional to the drive signal DS is applied to the drive coil 102.

By the structure of the first modified embodiment described above, the voltage amplitude of the reference signal RS applied to the capacitive sensors 230a and 230b can be maintained to be constant while controlling the current applied to the drive coil 102. As a result of this, the controllability of the angle of rotation of the mirror 101 can be maintained and also the angle of rotation of the mirror 101 can be detected accurately.

Second Modified Embodiment

A second modified embodiment of the first embodiment will be described below. In the second modified embodiment, a point that the output of the electrostatic capacitance detecting circuits 240a and 240b is proportional to the voltage amplitude of the reference signal RS is taken into consideration. Concretely, an output signal of the electrostatic capacitance detecting circuits 240a and 240b is divided by the voltage amplitude of the reference signal RS applied to the electrostatic capacitive sensors 230a and 230b. Accordingly, a circuit structured for stable detection of capacitance is used.

FIG. 8 denotes a schematic structure of a circuit 400 of the second modified embodiment. The adder 212 adds the drive signal DS and the reference signal RS. The voltage-current converting circuit 215 applies current proportional to an output of the adder 212, to the drive coil 102. A band-pass filter circuit 401 detects only the frequency component of the reference signal RS from the voltage signal in the first wire 111. An amplitude detecting circuit 402 outputs an amplitude value of an output signal of the band-pass filter circuit 401. Therefore, the voltage amplitude of the frequency component of the reference signal RS in the first wire 111 can be detected. Moreover, the subtracter 250 subtracts the output of the electrostatic capacitance detecting circuit 240a and the electrostatic capacitance detecting circuit 240b. Further, an output of the subtracter 250 is divided by an output of the amplitude detecting circuit 402. Accordingly, the angle can be detected without being affected by a change in the resistance value of the drive coil 102.

According to the structure of the second modified embodiment described above, the voltage amplitude of the reference signal RS applied to the electrostatic capacitive sensors 230a and 230b can be maintained to be constant while controlling the current applied to the drive coil 102. As a result of this, the controllability of the angle of rotation of the mirror 101 can be maintained and also the angle of rotation of the mirror 101 can be detected accurately.

Second Embodiment

Figure 9:
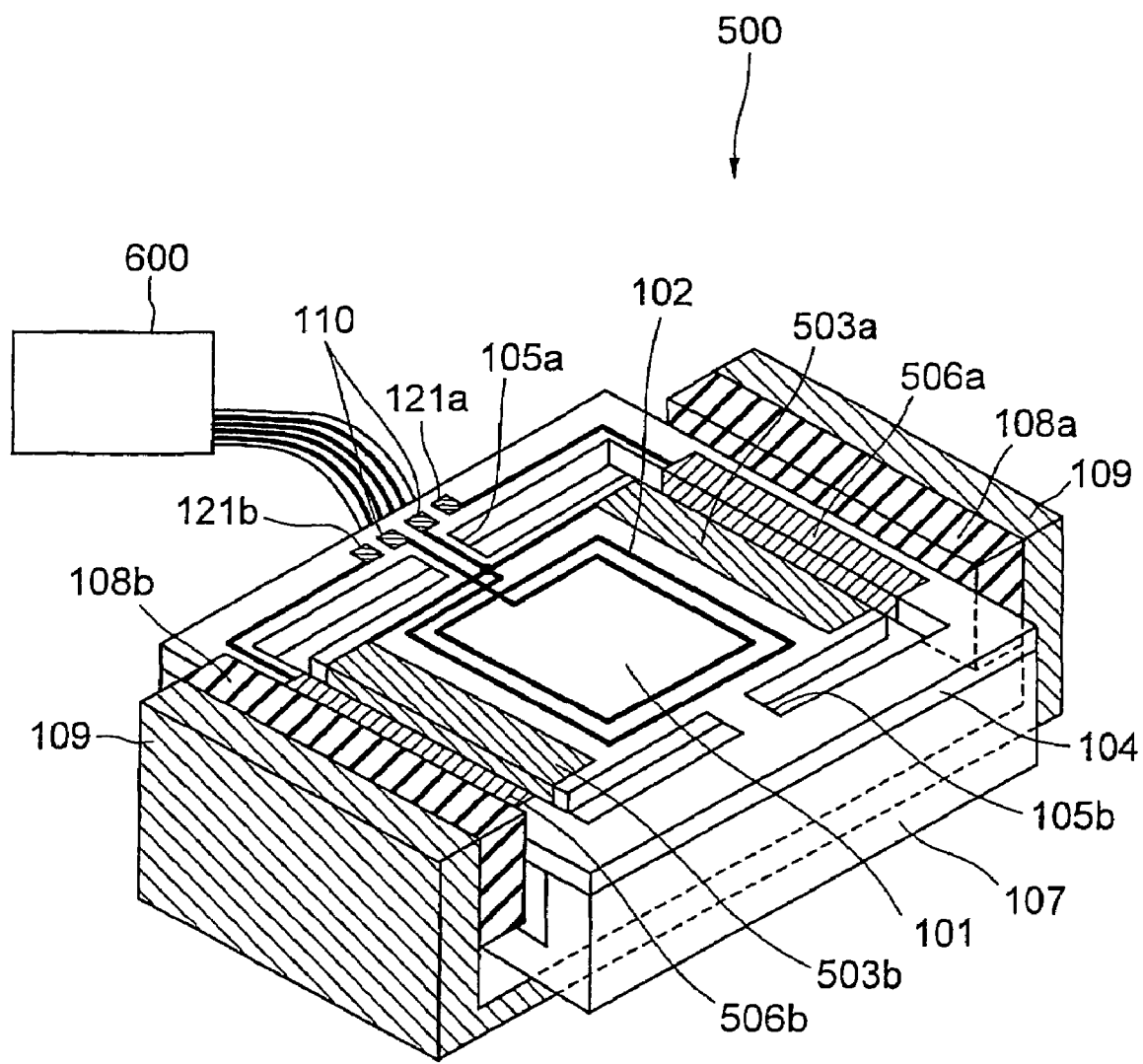
FIG. 9 is a diagram denoting a schematic structure of a deflector of a second embodiment.

FIG. 9 denotes a schematic structure of a deflector 500 according to a second embodiment of the present invention.

Same reference numerals are used for components which are identical with the components in the first embodiment and the description of these components is omitted to avoid repetition. A movable portion comb-teeth electrode 503a and a movable portion comb-teeth electrode 503b are formed respectively on two side surfaces of the mirror 101 facing each other. Each of the movable portion comb-teeth electrodes 503a and 503b has a periodic structure of a shape of comb teeth. The movable portion comb-teeth electrode 503a is provided at a position facing a fixed portion comb-teeth electrode 506a which will be described later. The movable portion comb-teeth electrode 503a and the fixed portion comb-teeth electrode 506a form the electrostatic capacitive sensor 230a (refer to FIG. 13). Moreover, the movable portion comb-teeth electrode 503b is formed at a position facing a fixed portion comb-teeth electrode 506b which will be described later. The movable portion comb-teeth electrode 503b and the fixed portion comb-teeth electrode 506b form the electrostatic capacitive sensor 230b (refer to FIG. 13). Each of the movable portion comb-teeth electrodes 503a and 503b correspond to the first electrode. Each of the movable portion comb-teeth electrodes 506a and 506b correspond to the second electrode.

Figure 10:
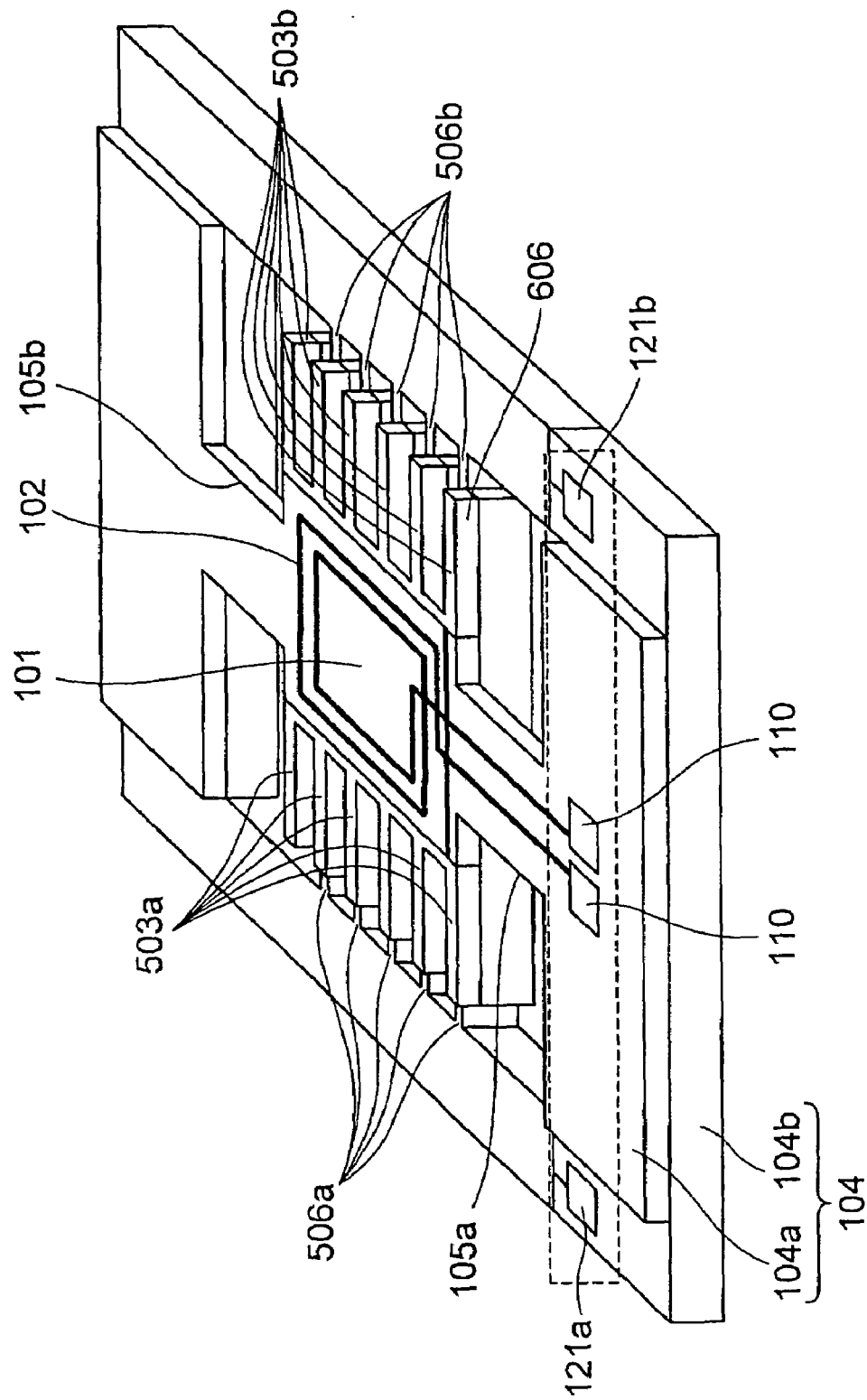
FIG. 10 is an enlarged view of a structure near a comb-teeth electrode of the second embodiment.

FIG. 10 denotes details of a structure near these comb-teeth electrodes. The supporting member 104 includes a supporting member 104b and a supporting member 104a laminated on the supporting member 104b. The torsion bars 105a and 105b are provided to the supporting member 104a. The movable portion comb-teeth electrodes 503a and 503b correspond to a portion of an active layer 606. The portion of the active layer 606 is subjected to doping by ion implantation and an electric resistance of a surface portion is reduced.

Moreover, an insulating film such as silicon oxide film which is not shown in the diagram is formed on the supporting member 104b. Wires and electrode portions 121a and 121b are formed on the insulating film by forming a low resistance thin film of a material such as aluminum, and then patterning. The fixed portion comb-teeth electrodes 506a and 506b are formed on an extended portion of the supporting member 104b. Each of the fixed portion comb-teeth electrodes 506a and 506b has a periodic structure of the shape of comb teeth. By using the comb-teeth electrodes, namely the movable portion comb-teeth electrodes 503a and 503b and the fixed portion comb-teeth electrodes 506a and 506b, there is an increase in an amount of a change in the electrostatic capacitance corresponding to the change in the angle of rotation of the mirror 101. As a result of this, the angle can be detected accurately. The movable portion comb-teeth electrodes 503a and 503b correspond to comb-teeth formed on the movable plate. The fixed portion comb-teeth electrodes 506a and 506b correspond to comb-teeth provided by extending from a fixed end.

Figure 11A:
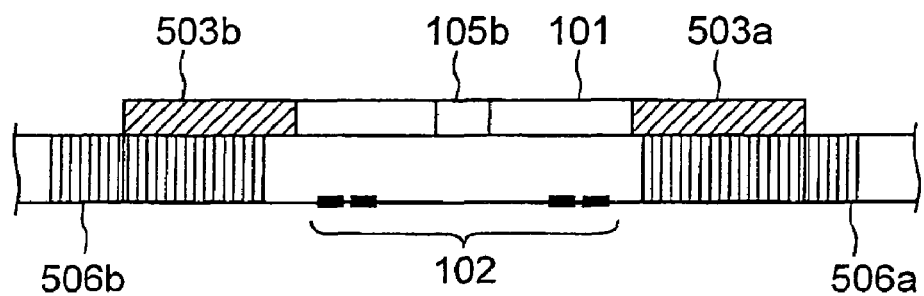
FIG. 11A is a diagram denoting a movement of a movable plate in the second embodiment.

FIG. 11A denotes a cross-sectional structure of an area near the comb-teeth electrode as viewed from a side of the torsion bar 105b. As it is evident from FIG. 11A, the movable portion comb-teeth electrodes 503a and 503b are formed at positions offset by a predetermined quantity in an upward direction in the diagram with respect to the fixed portion comb-teeth electrodes 506a and 506b. The mirror 101 of the deflector 500 rotates around an axis of rotation (not shown in the diagram) in a direction shown by the arrows Ya1 and Yb1 in FIG. 11B and in a direction shown by the arrows Ya2 and Yb2 in FIG. 11C. A relationship between the angle of rotation of the mirror 101 and the change in the capacitance of the electrostatic capacitive sensors 230a and 230b will be described below with reference to FIG. 12.

When the mirror 101 of the deflector 500 is substantially parallel to the supporting member 104a, the angle of rotation of the mirror 101 is 0 degree or near 0 degree. In this condition, an area of an electrode portion of the respective movable portion comb-teeth electrodes 503a and the fixed portion comb-teeth electrode 506a facing each other, and the movable portion comb-teeth electrode 503b and the fixed portion comb-teeth electrode 506b facing each other is roughly zero. In other words, as shown in FIG. 11A, when viewed from a direction parallel to the axis of rotation (not shown in the diagram), each of the movable portion comb-teeth electrode 503a and the fixed portion comb-teeth electrode 506a, and the movable portion comb-teeth electrode 503b and the fixed portion comb-teeth electrode 506b do not have an exactly overlapping portion. Therefore, both the electrostatic capacitance between the movable portion comb-teeth electrode 503a and the fixed portion comb-teeth electrode 506a, and the electrostatic capacitance between the movable portion comb-teeth electrode 503b and the fixed portion comb-teeth electrode 506b is roughly zero.

Figure 11B:
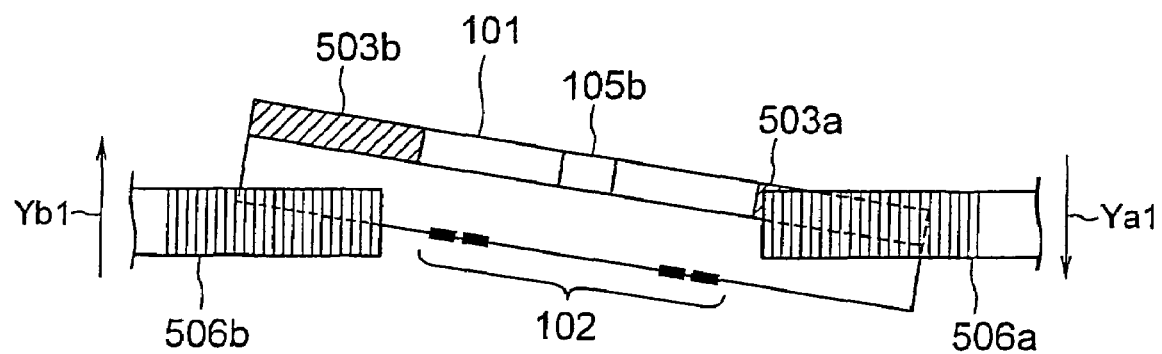
FIG. 11B is another diagram denoting the movement of the movable plate in the second embodiment.
Figure 12:
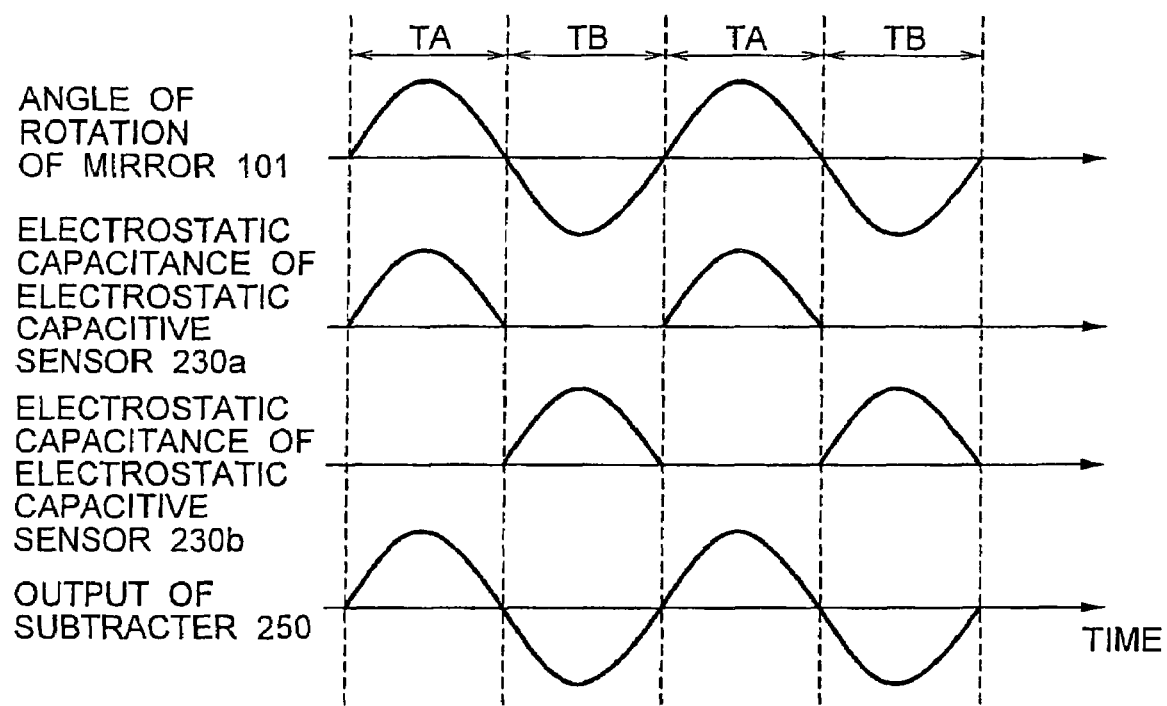
FIG. 12 is a diagram denoting a change in an output of a capacitive sensor of the second embodiment.

When the mirror 101 rotates in a direction shown by the arrows Ya1 and Yb1 shown in FIG. 11B and returns to the parallel position, let the time taken by the mirror 101 for this rotation be TA. When the mirror 101 attains the maximum angle of rotation in a right rotation shown by the arrows Ya1 and Yb1, an area of the portion of the movable portion comb-teeth electrode 503a and the fixed portion comb-teeth electrode 506a facing each other becomes the maximum. Due to this, the electrostatic capacitance of the electrostatic capacitive sensor 230a which is formed by the movable portion comb-teeth electrode 503a and the fixed portion comb-teeth electrode 506a becomes the maximum. Whereas, the movable portion comb-teeth electrode 503b and the fixed portion comb-teeth electrode 506b are away from each other as compared to a status when the angle of rotation of the mirror 101 is roughly zero. Therefore, the electrostatic capacitance of the electrostatic capacitive sensor 230b which is formed by the movable portion comb-teeth electrode 503b and the fixed portion comb-teeth electrode 506b is same as when the angle of rotation is roughly zero.

Figure 11C:
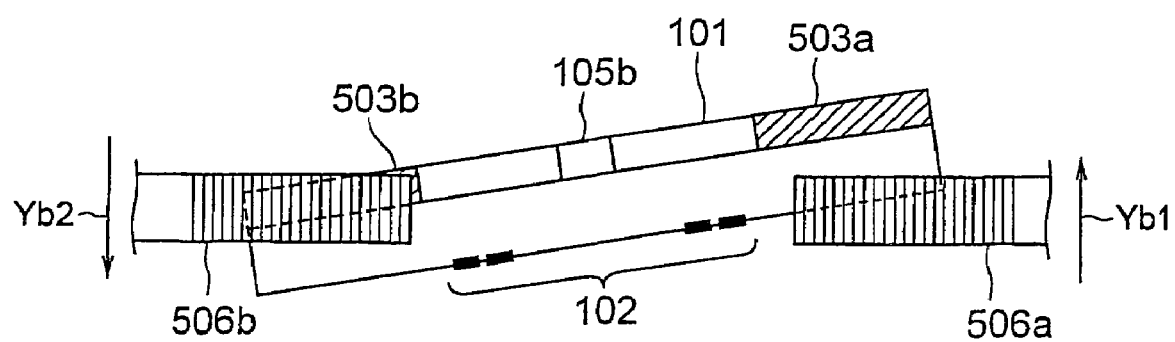
FIG. 11C is still another diagram denoting the movement of the movable plate in the second embodiment.

Moreover, when the mirror 101 rotates in a direction shown by the arrows Ya2 and Yb2 in FIG. 11C and returns to the parallel position, let the time taken by the mirror 101 for this rotation be TB. When the mirror 101 attains the maximum angle of rotation in a left rotation shown by the arrows Ya2 and Yb2, the area of the portion of the movable portion comb-teeth electrode 503b and the fixed portion comb-teeth electrode 506b facing each other becomes the maximum. Due to this, the electrostatic capacitance of the electrostatic capacitive sensor 230b becomes the maximum. Whereas, the movable portion comb-teeth electrode 503a and the fixed portion comb-teeth electrode 506a are away from each other as compared to a status when the angle of rotation of the mirror 101 is roughly zero. Therefore, the electrostatic capacitance of the electrostatic capacitive sensor 230a is the same as when the angle of rotation is roughly zero.

Thus, according to as to whether the angle of rotation of the mirror 101 is positive or negative (according to the direction of rotation), there is a change in the electrostatic capacitance of any one of the electrostatic capacitive sensor 230a and the electrostatic capacitive sensor 230b, and there is no change in the electrostatic capacitance of the other electrostatic capacitive sensor. Therefore, an output signal of electrostatic capacitance detecting circuits 640a and 640b described later, which detect the electrostatic capacitance, appears only in any one of the two electrostatic capacitive sensors 230a and 230b. Concretely, when the mirror 101 rotates in the right rotation shown by the arrows Ya1 and Yb1 (FIG. 11B), the output signal appears in the electrostatic capacitance detecting circuit 640*a* and the output signal does not appear in the electrostatic capacitance detecting circuit 640*b*. Whereas, when the mirror 101 rotates in the left rotation shown by the arrows Ya2 and Yb2 (FIG. 1C), the output signal does not appear in the electrostatic capacitance detecting circuit 640*a*, but the output signal appears in the electrostatic capacitance detecting circuit 640*b*. An output signal of the subtracter 250 is a signal in which the output signal from the electrostatic capacitance detecting circuit 640*b* is subtracted from the output signal of the electrostatic capacitance detecting circuit 640*a*. A result of subtraction is a value proportional to the angle of rotation of the mirror 101 and changes with a same phase as a phase of the angle of rotation. Therefore, the angle of rotation and the direction of rotation of the mirror 101 can be determined from the output signal of the subtracter 250.

Figure 13:
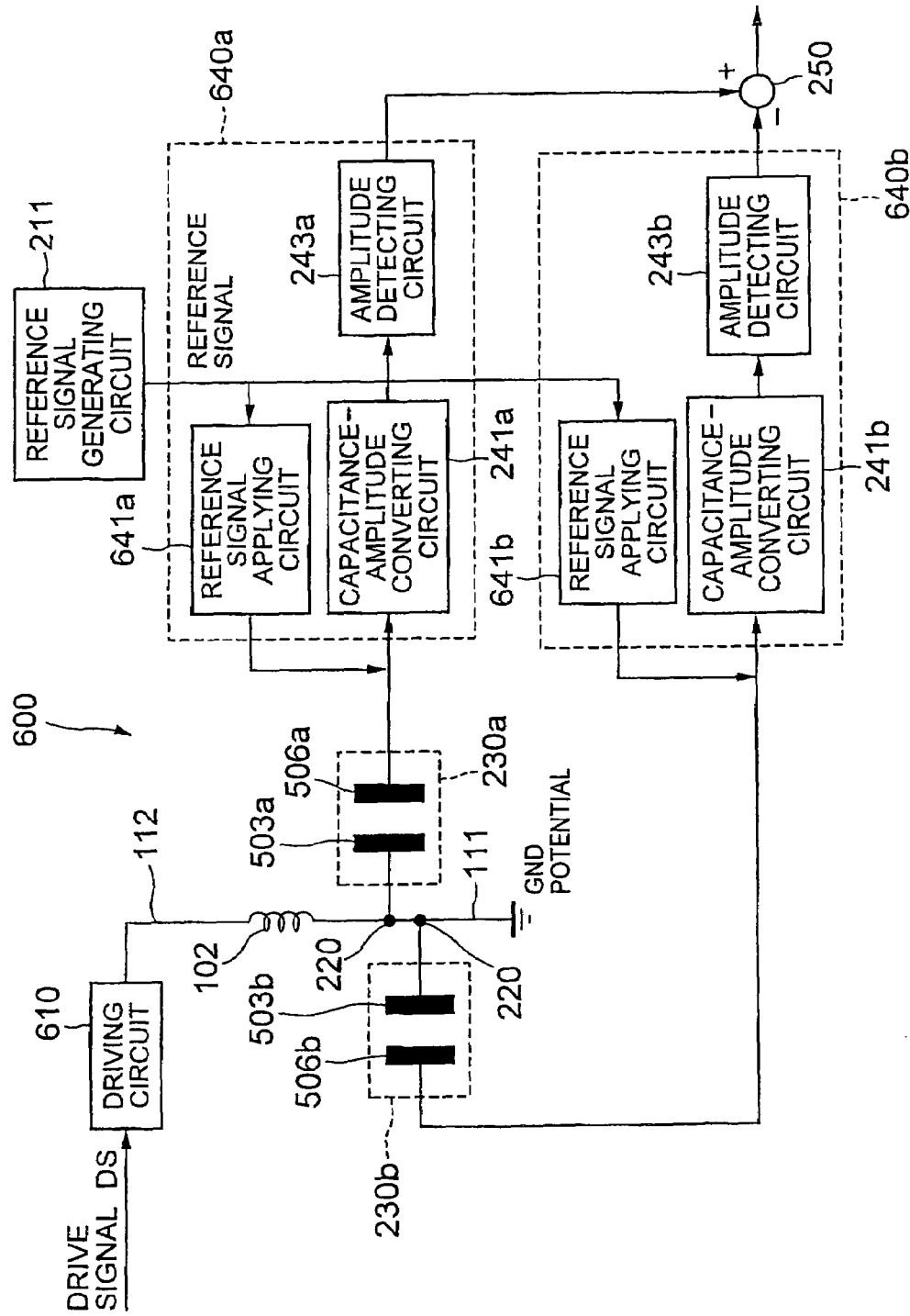
FIG. 13 is a diagram denoting a circuit structure of the second embodiment.
Figure 14:
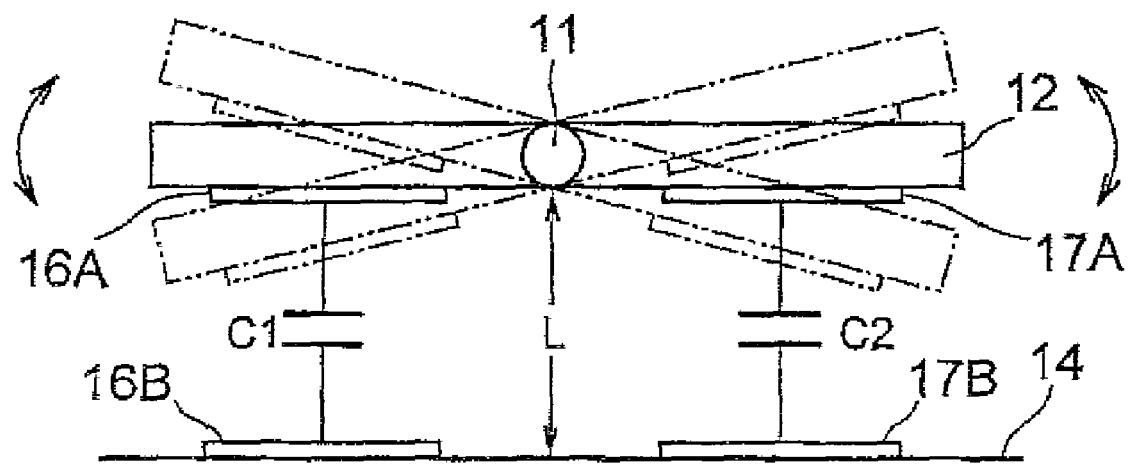
FIG. 14 is a diagram denoting a conventional structure for an angle detection of a mirror.

FIG. 13 denotes a schematic structure of a circuit 600 which detects the electrostatic capacitance. In the second embodiment, the movable portion comb-teeth electrode 503*a* and the movable portion comb-teeth electrode 503*b* are connected on the rear surface of the mirror 101 to the first end of the drive coil 102 and to the first wire 111 at the connecting portion 220. The first wire 111 is drawn to the outside of the mirror 101 via the torsion bar 105*a*. The first wire 111 drawn, is connected to the reference potential, for example GND potential, of the electrostatic capacitance detecting circuit which is installed outside the deflector 500. Moreover, the second end of the drive coil 102 is connected to the second wire 112. The second wire 112 is connected to a driving circuit 610 installed outside the deflector 500.

The fixed portion comb-teeth electrode 506*a* is connected to a reference signal applying circuit 641*a* and the capacitance-amplitude converting circuit 241*a*. The fixed portion comb-teeth electrode 506*b* is connected to a reference signal applying circuit 641*b* and the capacitance-amplitude converting circuit 241*b*. For detecting the capacitance, the reference signal applying circuits 641*a* and 641*b* apply the reference signal to the fixed portion comb-teeth electrodes 506*a* and 506*b* respectively. The capacitance-amplitude converting circuits 241*a* and 241*b* detect the current flowing through the fixed portion comb-teeth electrodes 506*a* and 506*b* respectively. Further, the capacitance-amplitude converting circuits 241*a* and 241*b* output a capacitance value of the electrostatic capacitive sensors 230*a* and 230*b* as an output of amplitude of a detected signal. The amplitude detecting circuits 243*a* and 243*b* are circuits which detect amplitude of the output signal of the capacitance-amplitude converting circuits 241*a* and 241*b* respectively. Therefore, the capacitance-amplitude converting circuits 241*a* and 241*b* output a signal equivalent to the capacitance value of the electrostatic capacitive sensors 230*a* and 230*b*.

As mentioned above, the change in the capacitance of the electrostatic capacitive sensor 230*a* and the capacitive sensor 230*b* appears complimentarily. Therefore, by deriving a difference between the outputs of the electrostatic capacitance detecting circuit 640*a* connected to the electrostatic capacitive sensor 230*a* and the electrostatic capacitance detecting circuit 640*b* connected to the electrostatic capacitive sensor 230*b*, the angle of rotation of the mirror 101 can be determined. In this structure, the drive signal DS for driving and the reference signal RS for detecting can be applied individually. As a result of this, an angle signal can be achieved by a simple circuit.

In this case, similarly as in the first embodiment, the frequency of the reference signal RS is set to a value which is not in the drive frequency band. It is further desirable, that the frequency of the reference signal RS is set to a value which is higher by predetermined multiples, for example more than ten times of the maximum value in the drive frequency band. Accordingly, it is possible to reduce the effect of the drive signal DS and detect accurately the angle of detection.

In the second embodiment, similarly as in the structure of the first embodiment, only two wires, the first wire 111 and the second wire 112 are disposed on the torsion bar 105*a*. Due to this, as compared to the structure in which the wires are drawn simply (FIG. 6C), the width of the torsion bar 105*a* can be reduced. As a result of this, the degree of freedom of designing of the torsion bars 105*a* and 105*b* is improved.

The electrostatic capacitance detecting circuit 240*a*, the electrostatic capacitance detecting circuit 240*b*, and the driving circuit 310 in FIG. 7 described in the first embodiment correspond to the driving circuit 610, the electrostatic capacitance detecting circuit 640*a*, and the electrostatic capacitance detecting circuit 640*b* in FIG. 10 described in the second embodiment. Further, the circuit structure described in the second embodiment can be applied to the first embodiment or the circuit structure described in the first embodiment can be applied to the second embodiment. Thus, the present invention can have various modifications which fall within the basic teachings herein set forth.

Thus, the deflector of the present invention is suitable as a deflector which includes an angle detector for detecting an angle of a movable plate.

What is claimed is:

1. A deflector comprising:
   a movable plate;
   a fixed portion;
   a pair of elastic members which pivotably support the movable plate with respect to the fixed portion;
   a drive coil provided on the movable plate;
   a magnetic flux generator which generates a magnetic flux which acts in the drive coil;
   an angle detector which outputs an angle of oscillation of the movable plate as a change of electrical characteristics, the angle detector detects the angle of oscillation of the movable plate based on an electrostatic capacitance between a first electrode on the movable plate and a second electrode provided facing the first electrode;
   a connecting portion which electrically connects on the movable plate a first end out of two ends of the drive coil and one end of an electric terminal of the angle detector, the connecting portion connects the first electrode and the first end of the drive coil;
   a first wire which is drawn from the connecting portion up to the fixed portion via the elastic member; and
   a circuit which generates and applies a signal to the connecting portion, the signal is generated based upon adding a reference signal used for a detection of the electrostatic capacitance and a driving signal applied to the drive coil so as to oscillate the movable plate.

2. The deflector according to claim 1, further comprising:
   an electrostatic capacitance detecting circuit which is connected to the second electrode formed on the fixed portion and detects an electrostatic capacitance between the first electrode and the second electrode;
   a reference signal generating circuit which generates a reference signal required for an operation of the electrostatic capacitance detecting circuit;
   an adder which adds up a drive command signal of the drive coil and the reference signal; and
   an amplifier which amplifies an output of the adder and supplies an amplified output to the drive coil, wherein the output of the amplifier is connected on a side of the fixed portion to the first wire.

3. The deflector according to claim 2, wherein
the reference signal generating circuit generates a reference signal of a frequency which is not in a drive frequency band of the deflector.

4. The deflector according to claim 3, wherein
the reference signal generating circuit generates a reference signal of a frequency in a band of frequency which is higher by predetermined multiples of a maximum value in the drive frequency band.

5. The deflector according to claim 2, wherein
the amplifier includes a current amplifying circuit which controls such that a current to the drive coil is proportional to the drive command signal, and
the reference signal generating circuit includes an amplitude controller which controls an amplitude such that a frequency component of the reference signal of a voltage in the first electrode is constant.

6. The deflector according to claim 2, wherein
the amplifier includes a current amplifying circuit which controls such that the current to the drive coil is proportional to the drive command signal, and
the electrostatic capacitance detecting circuit includes a divider which divides a value of detected capacitance by an amplitude of a frequency component of the reference signal of a voltage in the first electrode.

7. The deflector according to claim 2, wherein
the first electrode includes comb teeth formed on an end face of the movable plate, and
the second electrode includes comb teeth formed by extending from a fixed end facing the comb teeth on the end face of the movable plate.

8. The deflector according to claim 2, wherein
the first electrode includes a plurality of electrodes formed on the movable plate symmetrically with respect to an axis of rotation of the movable plate,
the second electrode includes a plurality of electrodes facing the plurality of electrodes on the movable plate, and
regarding a capacitance of the electrode on the movable plate and of the electrode facing the electrode on the movable plate, a difference between capacitance of the electrodes disposed symmetrically is let to be an angle.

9. The deflector according to claim 1, wherein
the first electrode includes comb teeth formed on an end face of the movable plate, and
the second electrode includes comb teeth formed by extending from a fixed end facing the comb teeth on the end face of the movable plate.

10. The deflector according to claim 1, wherein
the first electrode includes a plurality of electrodes formed on the movable plate symmetrically with respect to an axis of rotation of the movable plate,
the second electrode includes a plurality of electrodes facing the plurality of electrodes on the movable plate, and
regarding a capacitance of the electrode on the movable plate and of the electrode facing the electrode on the movable plate, a difference between capacitance of the electrodes disposed symmetrically is let to be an angle.

11. A deflector comprising:
a movable plate;
a fixed portion;
a pair of elastic members which pivotably support the movable plate with respect to the fixed portion;
a drive coil provided on the movable plate;
a magnetic flux generator which generates a magnetic flux which acts in the drive coil;

an angle detector which outputs an angle of oscillation of the movable plate as a change of electrical characteristics, the angle detector detects the angle of oscillation of the movable plate based on an electrostatic capacitance between a first electrode on the movable plate and a second electrode provided facing the first electrode;

a connecting portion which electrically connects on the movable plate a first end out of two ends of the drive coil and one end of an electric terminal of the angle detector, the connecting portion connects the first electrode and the first end of the drive coil;

a first wire which is drawn from the connecting portion up to the fixed portion via the elastic member;

an electrostatic capacitance detecting circuit which is connected to the second electrode formed on the fixed portion and detects an electrostatic capacitance between the first electrode and the second electrode;

a reference signal generating circuit which generates a reference signal required for an operation of the electrostatic capacitance detecting circuit;

an amplifier which amplifies a drive command signal of the drive coil; and a second wire which is electrically connected on the movable plate to the second end of the drive coil and drawn from the connecting portion up to the fixed portion via the elastic member, wherein an output of the amplifier is connected on a side of the fixed portion to the second wire, and the first wire is connected to a fixed electric potential.

12. The deflector according to claim 11, wherein
the reference signal generating circuit generates a reference signal of a frequency which is not in a drive frequency band of the deflector.

13. The deflector according to claim 12, wherein
the reference signal generating circuit generates a reference signal of a frequency in a band of frequency which is higher by predetermined multiples of a maximum value in the drive frequency band.

14. The deflector according to claim 11, wherein
the first electrode includes comb teeth formed on an end face of the movable plate, and
the second electrode includes comb teeth formed by extending from a fixed end facing the comb teeth on the end face of the movable plate.

15. The deflector according to claim 11, wherein
the first electrode includes a plurality of electrodes formed on the movable plate symmetrically with respect to an axis of rotation of the movable plate,
the second electrode includes a plurality of electrodes facing the plurality of electrodes on the movable plate, and
regarding a capacitance of the electrode on the movable plate and of the electrode facing the electrode on the movable plate, a difference between capacitance of the electrodes disposed symmetrically is let to be an angle.

16. The deflector according to claim 11, wherein
the first electrode includes comb teeth formed on an end face of the movable plate, and
the second electrode includes comb teeth formed by extending from a fixed end facing the comb teeth on the end face of the movable plate.

17. The deflector according to claim 11, wherein
the first electrode includes a plurality of electrodes formed on the movable plate symmetrically with respect to an axis of rotation of the movable plate,
the second electrode includes a plurality of electrodes facing the plurality of electrodes on the movable plate, and
regarding a capacitance of the electrode on the movable plate and of the electrode facing the electrode on the movable plate, a difference between capacitance of the electrodes disposed symmetrically is let to be an angle.

* * * * *